(12) United States Patent
Tamilarasan et al.

(10) Patent No.: US 10,996,869 B1
(45) Date of Patent: May 4, 2021

(54) FILE SYSTEM CHECK SYSTEM AND METHOD

(71) Applicant: EMC IP Holding Company, LLC, Hopkinton, MA (US)

(72) Inventors: Ashok Tamilarasan, Shrewsbury, MA (US); Vamsi K. Vankamamidi, Newton, MA (US); Philippe Armangau, Acton, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 16/670,879

(22) Filed: Oct. 31, 2019

(51) Int. Cl.
*G06F 3/06* (2006.01)
*G06F 11/07* (2006.01)

(52) U.S. Cl.
CPC .......... *G06F 3/0619* (2013.01); *G06F 3/0641* (2013.01); *G06F 3/0653* (2013.01); *G06F 3/0688* (2013.01); *G06F 11/0772* (2013.01)

(58) Field of Classification Search
None
See application file for complete search history.

(56) References Cited

U.S. PATENT DOCUMENTS

| | | | |
|---|---|---|---|
| 9,852,076 B1* | 12/2017 | Garg | G06F 16/172 |
| 2017/0300248 A1* | 10/2017 | Purohit | G06F 3/067 |
| 2017/0308305 A1* | 10/2017 | Goel | G06F 3/0641 |
| 2017/0315740 A1* | 11/2017 | Corsi | G06F 3/0688 |

* cited by examiner

*Primary Examiner* — Michael Alsip
(74) *Attorney, Agent, or Firm* — Brian J. Colandreo, Esq.; Mark H. Whittenberger, Esq.; Holland & Knight LLP (57) ABSTRACT

A method, computer program product, and computing system for processing higher-level metadata portions to identify each occurrence of a pointer to a lower-level metadata portion; and generating a pointer record within a memory device that memorializes each occurrence of a pointer to a lower-level metadata portion and identifies a specific lower-level metadata portion to which the pointer is pointing, thus resulting in a plurality of pointer records.

15 Claims, 5 Drawing Sheets

FILE SYSTEM CHECK SYSTEM AND METHOD

TECHNICAL FIELD

This disclosure relates to storage management processes and, more particularly, to storage management processes for use in high-availability storage systems.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible. Unfortunately and due to the complexity of such storage systems, corruption of the metadata that locates the data within a backend storage system may take a considerable amount of time to correct.

SUMMARY OF DISCLOSURE

In one implementation, a computer-implemented method is executed on a computing device and includes: processing higher-level metadata portions to identify each occurrence of a pointer to a lower-level metadata portion; and generating a pointer record within a memory device that memorializes each occurrence of a pointer to a lower-level metadata portion and identifies a specific lower-level metadata portion to which the pointer is pointing, thus resulting in a plurality of pointer records.

One or more of the following features may be included. The memory device may be assigned to a specific group of lower-level metadata portions. The plurality of pointer records on the memory device may be processed to generate a diagnostic reference count list for the specific group of lower-level metadata portions. The diagnostic reference count list may define a pointer count for each lower-level metadata portion included within the specific group of lower-level metadata portions. The diagnostic reference count list for the specific group of lower-level metadata portions may be compared to a previously-generated reference count list to identify metadata corruption. At least one occurrence of a pointer to a lower-level metadata portion may be indicative of a deduplication event concerning the specific group of lower-level metadata portions. The memory device may include a plurality of discrete memory devices.

In another implementation, a computer program product resides on a computer readable medium and has a plurality of instructions stored on it. When executed by a processor, the instructions cause the processor to perform operations including: processing higher-level metadata portions to identify each occurrence of a pointer to a lower-level metadata portion; and generating a pointer record within a memory device that memorializes each occurrence of a pointer to a lower-level metadata portion and identifies a specific lower-level metadata portion to which the pointer is pointing, thus resulting in a plurality of pointer records.

One or more of the following features may be included. The memory device may be assigned to a specific group of lower-level metadata portions. The plurality of pointer records on the memory device may be processed to generate a diagnostic reference count list for the specific group of lower-level metadata portions. The diagnostic reference count list may define a pointer count for each lower-level metadata portion included within the specific group of lower-level metadata portions. The diagnostic reference count list for the specific group of lower-level metadata portions may be compared to a previously-generated reference count list to identify metadata corruption. At least one occurrence of a pointer to a lower-level metadata portion may be indicative of a deduplication event concerning the specific group of lower-level metadata portions. The memory device may include a plurality of discrete memory devices.

In another implementation, a computing system includes a processor and memory is configured to perform operations including: processing higher-level metadata portions to identify each occurrence of a pointer to a lower-level metadata portion; and generating a pointer record within a memory device that memorializes each occurrence of a pointer to a lower-level metadata portion and identifies a specific lower-level metadata portion to which the pointer is pointing, thus resulting in a plurality of pointer records.

One or more of the following features may be included. The memory device may be assigned to a specific group of lower-level metadata portions. The plurality of pointer records on the memory device may be processed to generate a diagnostic reference count list for the specific group of lower-level metadata portions. The diagnostic reference count list may define a pointer count for each lower-level metadata portion included within the specific group of lower-level metadata portions. The diagnostic reference count list for the specific group of lower-level metadata portions may be compared to a previously-generated reference count list to identify metadata corruption. At least one occurrence of a pointer to a lower-level metadata portion may be indicative of a deduplication event concerning the specific group of lower-level metadata portions. The memory device may include a plurality of discrete memory devices.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
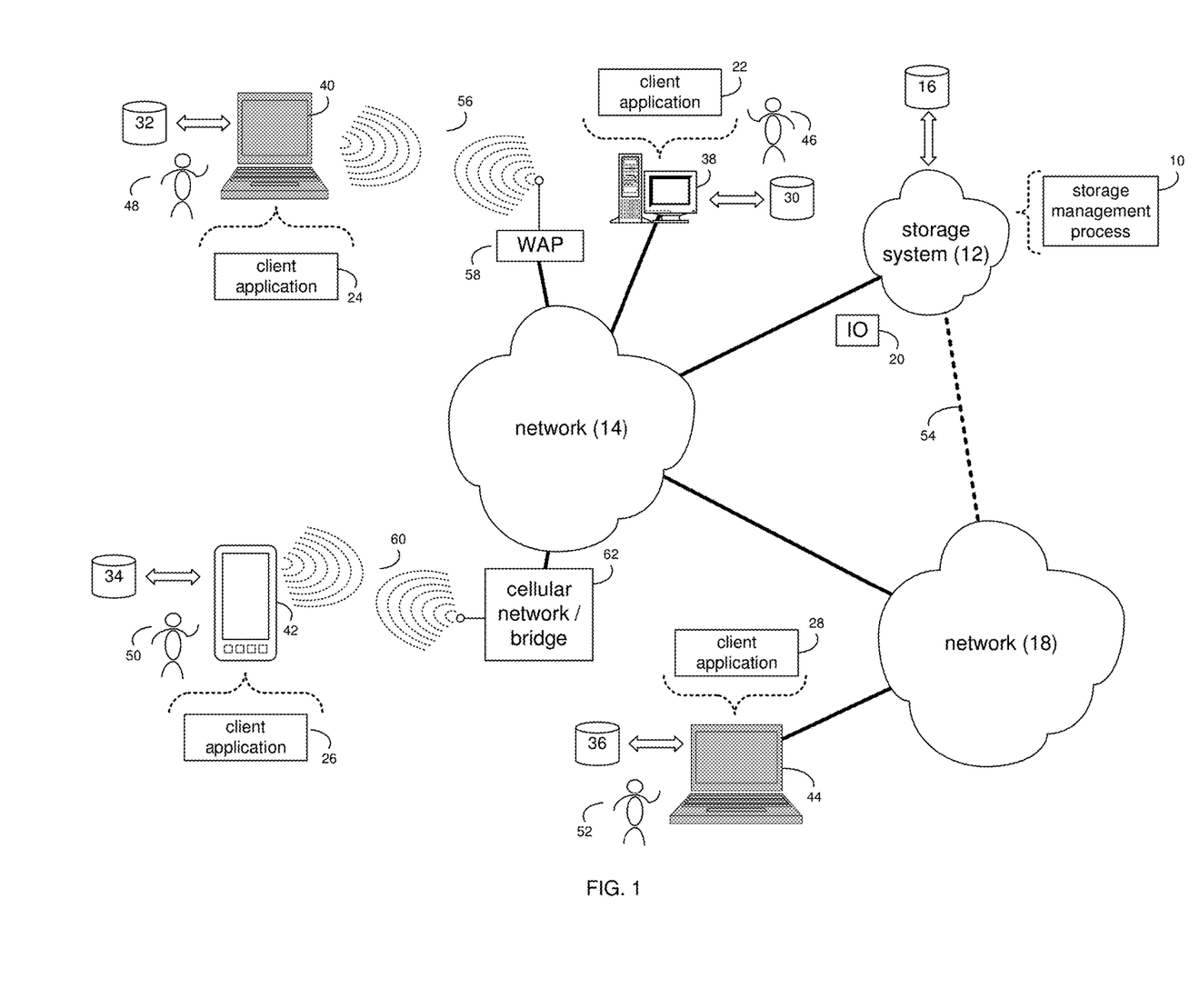
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™ Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RANI); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux or a custom operating system.

Figure 2:
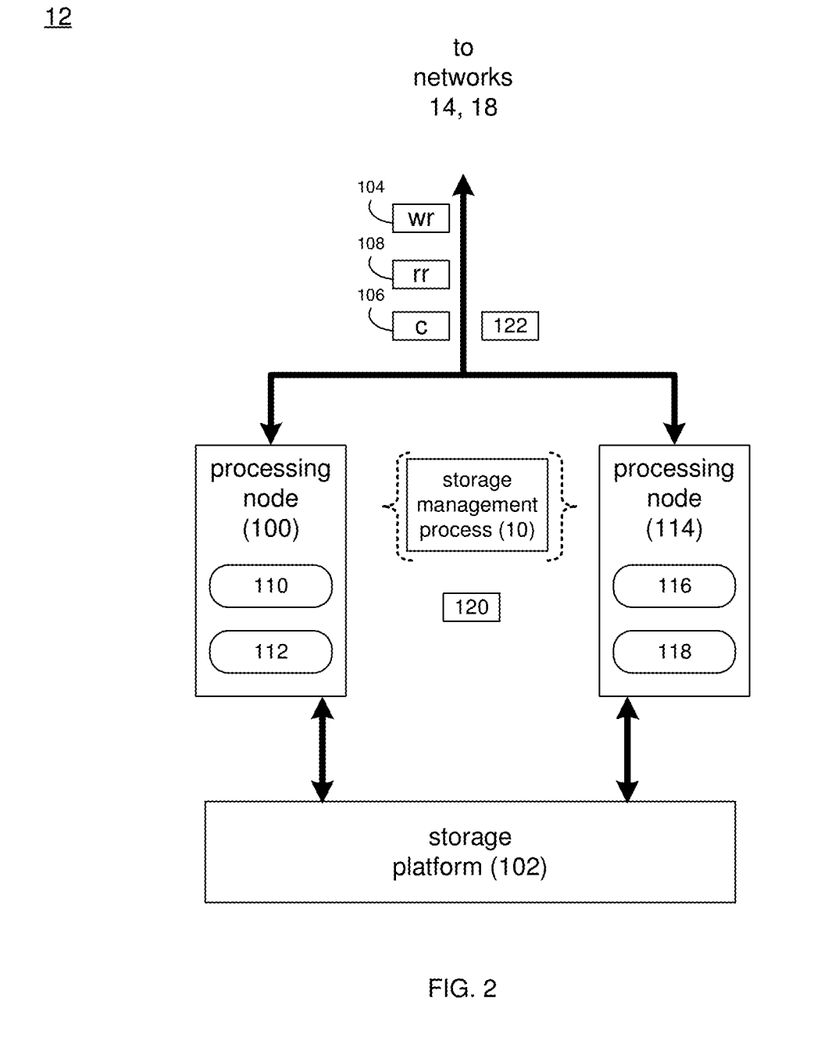
FIG. 2 is a diagrammatic view of the storage system of FIG. 1.

The Data Storage System:

Referring also to FIG. 2, there is shown a general implementation of storage system 12. In this general implementation, storage system 12 may include processing node 100. Processing node 100 may be configured to perform computational tasks and store data within storage platform 102.

Depending upon the manner in which storage system 12 is configured, storage platform 102 may include a single storage device (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 16) coupled to e.g., processing node 100, may be executed by one or more processors (not shown) and one or more memory architectures (not shown) included within processing node 100.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e. a request that content 106 be written to storage system 12) and data read request 108 (i.e. a request that content 106 be read from storage system 12).

During operation of processing node 100, content 106 to be written to storage system 12 may be processed by processing node 100. Additionally/alternatively and when storage system 12 is configured as an application server, content 106 to be written to storage system 12 may be internally generated by processing node 100. Processing node 100 may include buffer 110 (e.g., a portion of volatile memory) for initially storing content 106.

Processing node 100 may include/be coupled to cache memory system 112. Examples of cache memory system 112 may include but are not limited to a volatile, solid-state, cache memory system (e.g., a static RAM cache memory system) and/or a non-volatile, solid-state, cache memory system (e.g., a flash-based, cache memory system). Processing node 100 may move content 106 (which is currently stored within buffer 110) to cache memory system 112. Depending upon the manner in which cache memory system 112 is configured, processing node 100 may a) immediately write content 106 to storage platform 102 (if cache memory system 112 is configured as a write-through cache) or b) may subsequently write content 106 to storage platform 102 (if cache memory system 112 is configured as a write-back cache).

Storage system 12 may be configured to include a plurality of processing nodes, each of which may be configured to receive, generate and/or process content (e.g., content 106). For example and in addition to processing node 100, storage system 12 may include one or more additional processing nodes (e.g., processing node 114). Processing node 114 may also be configured to perform computational tasks and store data within storage platform 104.

Processing node 114 may include buffer 116 (e.g., a portion of volatile memory) for initially storing content 106. Processing node 114 may include/be coupled cache memory system 118. Examples of cache memory system 118 may include but are not limited to a volatile, solid-state, cache memory system (e.g., a static RAM cache memory system) and/or a non-volatile, solid-state, cache memory system (e.g., a flash-based, cache memory system). Processing node 114 may move content 106 (which is currently stored within buffer 116) to cache memory system 118. Depending upon the manner in which cache memory system 118 is configured, processing node 114 may a) immediately write content 106 to storage platform 102 (if cache memory system 118 is configured as a write-through cache) or b) may subsequently write content 106 to storage platform 102 (if cache memory system 118 is configured as a write-back cache).

Content Metadata:

As discussed above, when content 106 is received by processing node 100, content 106 may be initially stored within buffer 110. Content 106 may then be moved to cache memory system 112. Once content 106 is stored within cache memory system 112, content metadata 120 may be generated to define the specific location of content 106 within cache memory system 112. That way, in the event that processing node 100 receives a read request (e.g., read request 108) for content 106, the location of content 106 within cache memory system 112 may be determined by processing content metadata 120.

As also discussed above, content 106 may subsequently be moved from cache memory system 112 to storage platform 102. For example, storage management process 10 may obtain content 106 from cache memory system 112 and write content 106 to storage platform 102. Once content 106 is stored within storage platform 102, content metadata 120 may define the specific location of content 106 within storage platform 102. That way, in the event that processing node 100 receives a read request (e.g., read request 108) for content 106, the location of content 106 within storage platform 102 may be determined by processing content metadata 120.

As could be imagined, in the event that content metadata 120 becomes corrupted, storage management process 10 may not be able to locate content 106 within e.g., cache memory system 112 and/or storage platform 102.

Figure 3:
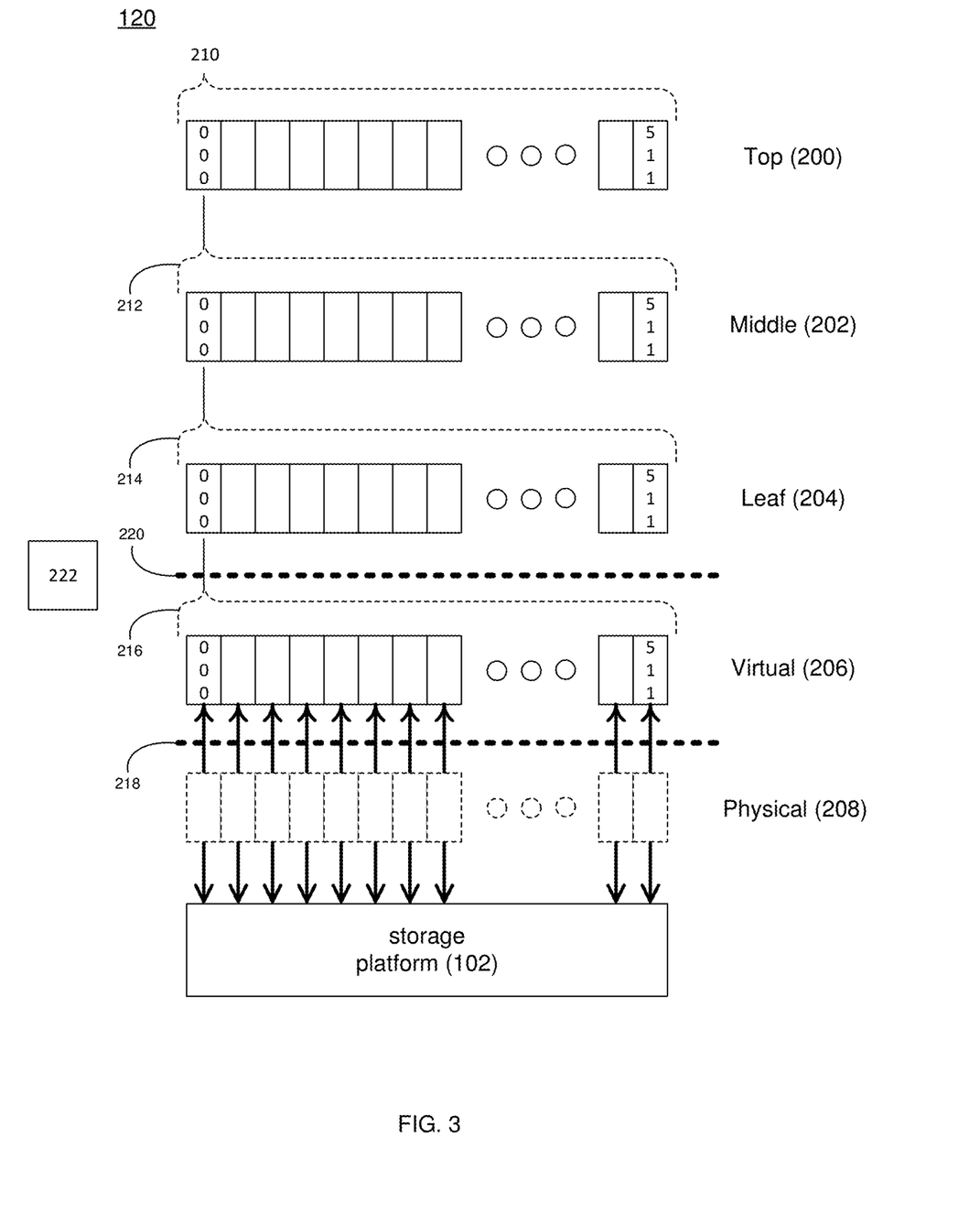
FIG. 3 is a diagrammatic view of a data mapping structure for use with the storage system of FIG. 1.

Referring also to FIG. 3, there is shown one possible example of content metadata 120. While the following discussion concerns one possible implementation of content metadata 120, this is for illustrative purposes only and is not intended to be a limitation of this disclosure, as other configurations are possible and are considered to be within the scope of this disclosure.

The structure of content metadata 120 may be multi-level in nature, wherein content metadata 120 may include e.g., top layer 200, middle layer 202, leaf layer 204 and virtual layer 206. Additional layers (e.g., physical layer 208 shown in phantom) may be positioned between virtual layer 208 and storage platform 102. However, physical layer 208 is not needed to understand the operation of storage management process 10 within this disclosure.

Top layer 200 may include a plurality of metadata portions (e.g., top portions 210). In this particular example, top layer 200 is shown to include five-hundred-twelve top portions (namely Top Portion 000-Top Portion 511). However, it is understood that the quantity of top portions 210 may be increased or decreased depending upon need, system capacity, and design criteria. Each of these top portions (e.g., top portions 210) may map to a plurality of metadata portions within middle layer 202.

Middle layer 202 may include a plurality of metadata portions (e.g., middle portions 212). In this particular example, middle layer 202 is shown to include five-hundred-twelve middle portions (namely Middle Portion 000-Middle Portion 511). However, it is understood that the quantity of middle portions 212 may be increased or decreased depending upon need, system capacity, and design criteria. Each of these middle portions (e.g., middle portions 212) may map to a plurality of metadata portions within leaf layer 204.

Leaf layer 204 may include a plurality of metadata portions (e.g., leaf portions 214). In this particular example, leaf layer 204 is shown to include five-hundred-twelve leaf portions (namely Leaf Portion 000-Leaf Portion 511). However, it is understood that the quantity of leaf portions 214 may be increased or decreased depending upon need, system capacity, and design criteria. Each of these leaf portions (e.g., leaf portions 214) may map to a plurality of metadata portions within virtual layer 206.

Virtual layer 206 may include a plurality of metadata portions (e.g., virtual portions 216). In this particular example, virtual layer 206 is shown to include five-hundred-twelve virtual portions (namely Virtual Portion 000-Virtual Portion 511). However, it is understood that the quantity of virtual portions 216 may be increased or decreased depending upon need, system capacity, and design criteria. Each of these virtual portions (e.g., virtual portions 216) may map to metadata portions within physical layer 208, which may be mapped to physical storage elements with storage platform 102.

Through the use of multi-level content metadata (e.g., content metadata 120), massive amounts of data within storage platform 102 may be accessible and locatable via mapping. For example, assume that each of virtual portions 216 is mapped to (or associated with) a four kilobyte block of physical storage within storage platform 102, either directly or indirectly (through physical layer 208).

As discussed above, each of leaf portions 214 may map to (in the example) five-hundred-twelve virtual portions (e.g., virtual portions 216) within virtual layer 206. Accordingly, each of leaf portions 214 may allow for mapping to two megabytes (i.e., four kilobytes×512) of physical storage within storage platform 102.

Further and as discussed above, each of middle portions 212 may map to (in the example) five-hundred-twelve leaf portions (e.g., leaf portions 214) within leaf layer 204. Accordingly, each of middle portions 212 may allow for mapping to one gigabyte (i.e., two megabytes×512) of physical storage within storage platform 102.

Additionally and as discussed above, each of top portions 210 may map to (in the example) five-hundred-twelve middle portions (e.g., middle portions 212) within middle layer 202. Accordingly, each of top portions 210 may allow for mapping to five-hundred-twelve gigabytes (i.e., one gigabyte×512) of physical storage within storage platform 102.

And in this example, top layer 200 is shown to include five-hundred-twelve top portions (e.g., top portions 210). Accordingly, top layer 200 (in its entirety) may allow for mapping to two-hundred-fifty-six terabytes (i.e., five-hundred-twelve gigabytes×512) of physical storage within storage platform 102.

Storage system 12 and/or storage platform 102 may utilize data compression technology and/or data deduplication technology to expand the capabilities of storage platform 102.

As is known in the art, data compression is a reduction in the number of bits needed to represent data. Compressing data may save storage capacity, may speed up file transfers, and may decrease costs for storage hardware and network bandwidth. Compression may be performed by a program that uses a formula or algorithm to determine how to shrink the size of the data. For instance, an algorithm may represent a larger string of bits with a smaller string of bits by using a dictionary for the conversion between them, Storage system 12 and/or storage platform 102 may utilize data compression technology between e.g., virtual layer 206 and storage platform 102 (e.g., proximate compression line 218) so that e.g., content 106 may be compressed prior to being written to storage platform 102.

As is known in the art, data deduplication is a technique for eliminating duplicate copies of repeating data. This technique may be used to improve storage utilization and may also be applied to network data transfers to reduce the number of bytes that must be sent. In the deduplication process, unique chunks of data, or byte patterns, are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times (the match frequency is dependent upon the chunk size), the amount of data that must be stored or transferred may be greatly reduced. Storage system 12 and/or storage platform 102 may utilize data deduplication technology between e.g., leaf layer 204 and virtual layer 206 (e.g., proximate deduplication line 220) so that e.g., content 106 is deduplicated prior to being compressed (as discussed above) and/or written to storage platform 102.

For example, each time that a piece of content (e.g., content 106) is received for storing within storage platform 102, a hash of the content (e.g., content 106) may be generated and compared to existing hashes within hash table 222 (which represents previously stored content).

As is known in the art, a hash is a algorithmic function that converts one value to another. Hashing data is a common practice in computer science and may be used for several purposes including cryptography, compression, checksum generation, and data indexing. Hashing may be used to create checksums (which may validate the integrity of files). For example, if a new file is received and it needs to be analyzed to determine if it is the same as an older file, the hash function may be run on the new file. If the hashed value for the new file is the same as the hashed value for the older file. If the files are identical. Conversely, if the hashed value for the new file is different from the hashed value for the older file. the files are not identical.

Accordingly, if the hash of newly-received content matches a hash within hash table 222, the identical content is already stored within storage platform 102. Therefore, instead of storing an additional copy of the same data, a pointer may be generated that simply points to the previously-stored content. Therefore, if the newly-received content is needed at a later date (due to e.g., a read request), a pointer within content metadata 120 may simply point to and locate the previously-stored content.

The use of such deduplication technology may greatly expand the storage capacity of storage platform 102. For example, it is foreseeable that an identical file may be stored dozens (if not hundreds) of times within storage platform 102. Accordingly and with such deduplication technology, a single copy of this file may be stored and dozens (if not hundreds) of pointers may point to the same file.

Unfortunately, in the event that such pointers get corrupted, the ability of storage management process 10 to retrieve content within storage platform 102 may be compromised. And if such corruption occurs, storage management process 10 may initiate a data recovery process (e.g., a file system checking process, such as FSCK or CHKDSK) to attempt to recover the unretrievable content.

As is known in the art, the system utility FSCK (i.e., file system consistency check) is a tool for checking the consistency of a file system in Unix and Unix-like operating systems, such as Linux, macOS, and FreeBSD. A similar command, CHKDSK, exists in Microsoft Windows and (its ancestor) MS-DOS.

Generally, FSCK is run either automatically at boot time, or manually by the system administrator. The command may work directly on data structures stored on disk, which are internal and specific to the particular file system in use—so an FSCK command tailored to the file system is generally required. The exact behaviors of various FSCK implementations vary, but they typically follow a common order of internal operations and provide a common command-line interface to the user. Most FSCK utilities provide options for either interactively repairing damaged file systems (the user must decide how to fix specific problems), automatically deciding how to fix specific problems (so the user does not have to answer any questions), or reviewing the problems that need to be resolved on a file system without actually fixing them. Partially recovered files where the original file name cannot be reconstructed are typically recovered to a "lost+found" directory that is stored at the root of the file system.

Unfortunately, such a file system checking process is very computationally expensive and requires that storage system 12 be taken offline for extended periods of time (possibly days) so that this file system checking process may be executed. Accordingly, it is desirable that this file system checking process be executed as quickly as possible.

Storage Management Process:

Assume for the following example that corruption of the above-described pointers included within content metadata 120 is suspected by storage management process 10. Accordingly and referring also to FIGS. 4-5, storage management process 10 may process 300 higher-level metadata portions to identify each occurrence of a pointer to a lower-level metadata portion. For example, storage management process 10 may process 300 leaf portions 214 to identify each occurrence of a pointer that points to virtual portions 216, as this is the location (e.g., deduplication line 220) within content metadata 120 wherein such pointers exist.

Figure 4:
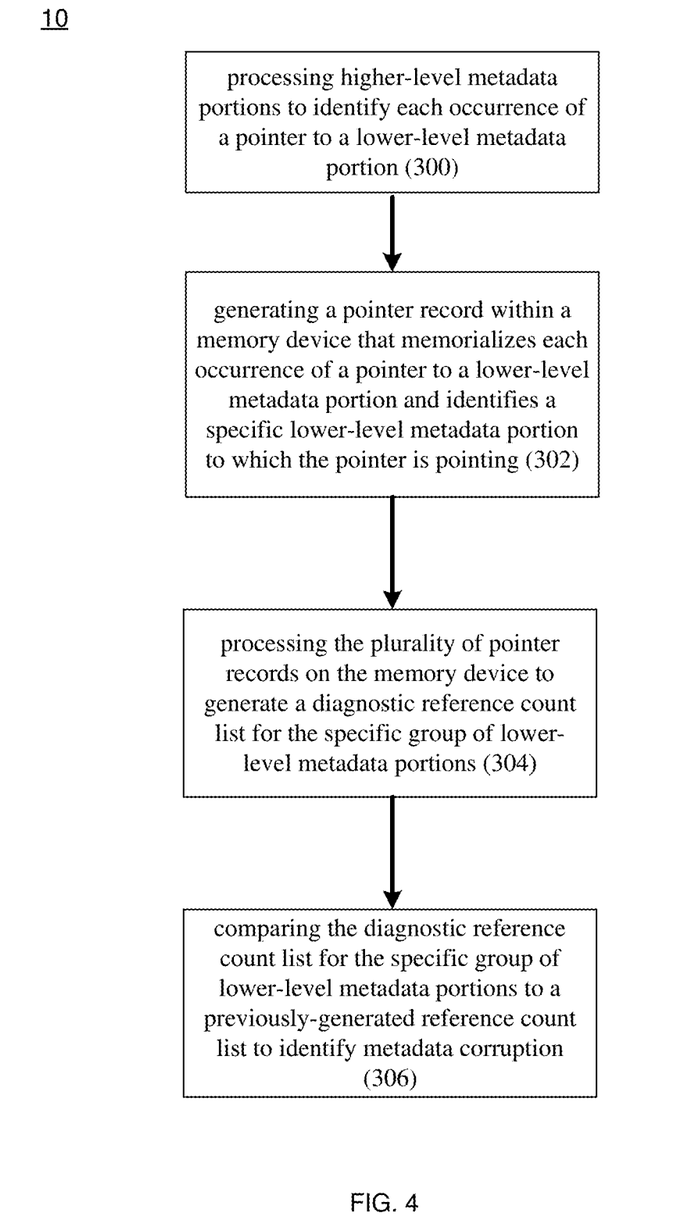
FIG. 4 is a flow chart of the storage management process of FIG. 1.

Specifically, storage management process 10 may process 300 all of the leaf portions 214 within content metadata 120 to identify any pointers that point to a particular virtual portion (included within virtual portions 216) within content metadata 120. As discussed above, content metadata 120 may enable storage management process 10 to locate content (e.g., content 106) within storage platform 102. Accordingly, every piece of content stored within storage platform 102 may be pointed to at least once within content metadata 120. And in the event that the same piece of content was attempted to be stored within storage platform 102 (and deduplication technology in utilized), multiple pointers may point to a single piece of content. Therefore if a single piece of content within storage platform 102 is pointed to only once, that piece of content was stored within storage platform 102 only once. However, if a single piece of content within storage platform 102 is pointed to e.g., twelve times, that piece of content was attempted to be stored within storage platform 102 twelve times.

Figure 5:
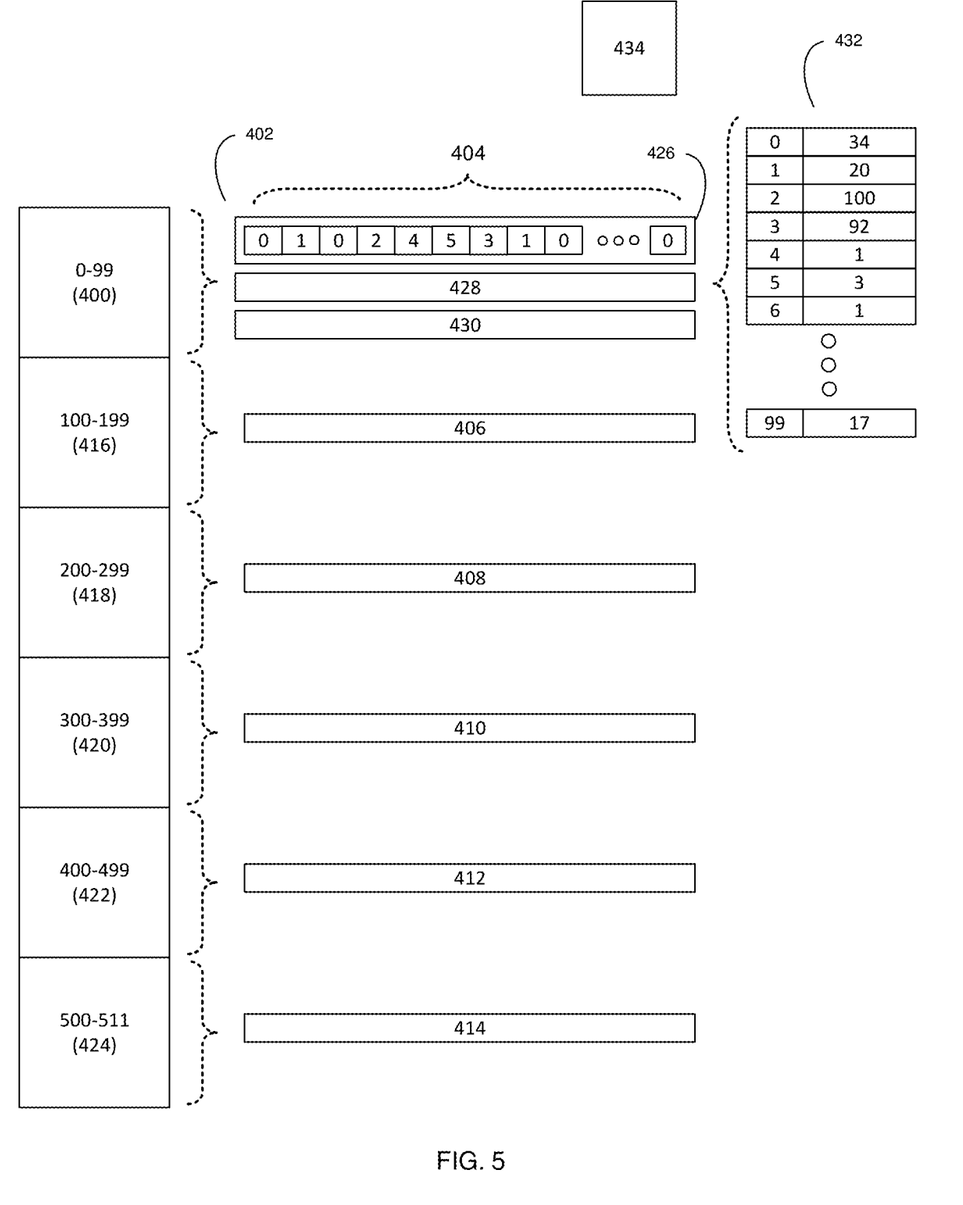
FIG. 5 is a diagrammatic view of a diagnostic reference count list for use with the storage system of FIG. 1.

Continuing with the above-stated example, storage management process 10 may process 300 at all of the leaf portions 214 within content metadata 120 to determine which leaf portions point to a specific group of lower-level metadata portions (e.g., a specific group of virtual portions 216). As discussed above, each leaf portion (e.g., one of leaf portions 214) within leaf layer 204 may map to a plurality (e.g., five-hundred-twelve) virtual portions 216 within virtual layer 206. The size of this specific group of virtual portions 216 examined (which may be referred to as an extent) may vary depending upon the capabilities of storage system 12. Accordingly, higher processing/memory capabilities of storage system 12 may result in larger groups of virtual portions 216 (e.g., larger extents); while lower processing/memory capabilities of storage system 12 may result in smaller groups of virtual portions 216 (e.g., smaller extents). In this particular example and for illustrative purposes, this specific group of virtual portions 216 (e.g., extent 400) examined is shown to include one-hundred of virtual portions 216 (i.e., namely virtual portions 0-99 of the above-described five-hundred-twelve virtual portions).

Storage management process 10 may generate 302 a pointer record within a memory device (e.g., memory device 402) that memorializes each occurrence of a pointer to a lower-level metadata portion (e.g., this specific group of virtual portions 216) and identifies a specific lower-level metadata portion (e.g., the specific virtual portion) to which the pointer is pointing, thus resulting in plurality of pointer records 404.

Memory device 402 may be assigned to a specific group (e.g., extent 400) of lower-level metadata portions (e.g., virtual portions 216), wherein other memory devices (e.g., memory devices 406, 408, 410, 412, 414) may be assigned to other specific groups (e.g., extents 416, 418, 420, 422, 424, respectively) of lower-level metadata portions (e.g., virtual portions 216).

Memory device 402 may include a plurality of discrete memory devices. For example, memory device 402 may include a first two megabyte buffer (e.g., buffer 426) that may be populated with plurality of pointer records 404 until full. And upon buffer 426 filling up, one or more additional two megabyte buffers (buffers 428, 430) may be utilized to continue storing plurality of pointer records 404.

For this particular example, the visible portion of pointer records 404 is shown to include pointer records that indicate that "Virtual Portion 0" was pointed to four times . . . that "Virtual Portion 1" was pointed to two times . . . that "Virtual Portion 2" was pointed to one time . . . that "Virtual Portion 3" was pointed to one time . . . that "Virtual Portion 4" was pointed to one time . . . and that "Virtual Portion 5" was pointed to one time.

Storage management process 10 may process 304 plurality of pointer records 404 on memory device 402 to generate a diagnostic reference count list 432 for the specific group (e.g., extent 400) of lower-level metadata portions (e.g., virtual portions 216). Diagnostic reference count list 432 may define a pointer count for each lower-level metadata portion included within the specific group (e.g., extent 400) of lower-level metadata portions (e.g., virtual portions 216). For example, diagnostic reference count list 432 may define (e.g., via the left hand column) every virtual portion included within the specific group (e.g., extent 400) of virtual portions 216 (namely Virtual Portions 0-99) and the number of pointers (i.e., a pointer count) that point to each of those virtual portions 216. For this illustrative example, the visible portion of diagnostic reference count list 432 is shown to include a pointer count of "34" for "Virtual Portion 0" . . . a pointer count of "20" for "Virtual Portion 1" . . . a pointer count of "100" for "Virtual Portion 2" . . . a pointer count of "92" for "Virtual Portion 3" . . . a pointer count of "1" for "Virtual Portion 4" . . . a pointer count of "3" for "Virtual Portion 5" . . . a pointer count of "1" for "Virtual Portion 6" . . . and a pointer count of "17" for "Virtual Portion 99".

At least one occurrence of a pointer to a lower-level metadata portion (e.g., any of virtual portions 216) may be indicative of a deduplication event concerning the specific group (e.g., extent 400) of lower-level metadata portions (e.g., virtual portions 216). For example and with respect to the visible portion of diagnostic reference count list 432, the following conclusions may be drawn:

- A Pointer Count of "34" for "Virtual Portion 0": 33 deduplication events occurred with respect to "Virtual Portion 0".
- A Pointer Count of "20" for "Virtual Portion 1": 19 deduplication events occurred with respect to "Virtual Portion 1".
- A Pointer Count of "100" for "Virtual Portion 2": 99 deduplication events occurred with respect to "Virtual Portion 2".
- A Pointer Count of "92" for "Virtual Portion 3": 91 deduplication events occurred with respect to "Virtual Portion 3".
- A Pointer Count of "1" for "Virtual Portion 4": 0 deduplication events occurred with respect to "Virtual Portion 4".
- A Pointer Count of "3" for "Virtual Portion 5": 2 deduplication events occurred with respect to "Virtual Portion 5".
- A Pointer Count of "1" for "Virtual Portion 6": 0 deduplication events occurred with respect to "Virtual Portion 6".
- A Pointer Count of "17" for "Virtual Portion 99": 16 deduplication events occurred with respect to "Virtual Portion 99".

Once diagnostic reference count list 432 is generated, storage management process 10 may compare 306 diagnostic reference count list 432 for the specific group (e.g., extent 400) of lower-level metadata portions (e.g., virtual portions 216) to a previously-generated reference count list (e.g., previously-generated reference count list 434) to identify metadata corruption. For example, previously-generated reference count list 434 may be a list of pointers that storage management process 10 had been using and suspected of being corrupted. Accordingly and in response to this suspicion, diagnostic reference count list 432 may be generated (in the manner defined above) so that it may be compared to previously-generated reference count list 434, wherein any mismatch between previously-generated reference count list 434 and diagnostic reference count list 432 may be indicative of corruption of content metadata 120.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   processing higher-level metadata portions to identify each occurrence of a pointer to a lower-level metadata portion;
   generating a pointer record within a memory device that memorializes each occurrence of a pointer to a lower-level metadata portion and identifies a specific lower-level metadata portion to which the pointer is pointing, thus resulting in a plurality of pointer records, wherein the memory device is assigned to a specific group of lower-level metadata portions; and
   identifying possible metadata corruption in one or more pointers, wherein identifying possible metadata corruption in the one or more pointers includes comparing a diagnostic reference count list for the specific group of lower-level metadata portions to a previously-generated reference count list, wherein the previously-generated reference count list includes a list of previously used pointers suspected of being corrupt.

2. The computer-implemented method of claim 1 further comprising:
   processing the plurality of pointer records on the memory device to generate a diagnostic reference count list for the specific group of lower-level metadata portions.

3. The computer-implemented method of claim 2 wherein the diagnostic reference count list defines a pointer count for each lower-level metadata portion included within the specific group of lower-level metadata portions.

4. The computer-implemented method of claim 1 wherein at least one occurrence of a pointer to a lower-level metadata portion is indicative of a deduplication event concerning the specific group of lower-level metadata portions.

5. The computer-implemented method of claim 1 wherein the memory device includes a plurality of discrete memory devices.

6. A computer program product residing on a computer readable medium having a plurality of instructions stored thereon which, when executed by a processor, cause the processor to perform operations comprising:
   processing higher-level metadata portions to identify each occurrence of a pointer to a lower-level metadata portion;
   generating a pointer record within a memory device that memorializes each occurrence of a pointer to a lower-level metadata portion and identifies a specific lower-level metadata portion to which the pointer is pointing, thus resulting in a plurality of pointer records, wherein the memory device is assigned to a specific group of lower-level metadata portions; and
   identifying possible metadata corruption in one or more pointers, wherein identifying possible metadata corruption in the one or more pointers includes comparing a diagnostic reference count list for the specific group of lower-level metadata portions to a previously-generated reference count list, wherein the previously-generated reference count list includes a list of previously used pointers suspected of being corrupt.

7. The computer program product of claim 6 further comprising:
   processing the plurality of pointer records on the memory device to generate a diagnostic reference count list for the specific group of lower-level metadata portions.

8. The computer program product of claim 7 wherein the diagnostic reference count list defines a pointer count for each lower-level metadata portion included within the specific group of lower-level metadata portions.

9. The computer program product of claim 6 wherein at least one occurrence of a pointer to a lower-level metadata portion is indicative of a deduplication event concerning the specific group of lower-level metadata portions.

10. The computer program product of claim 6 wherein the memory device includes a plurality of discrete memory devices.

11. A computing system including a processor and memory configured to perform operations comprising:
    processing higher-level metadata portions to identify each occurrence of a pointer to a lower-level metadata portion;
    generating a pointer record within a memory device that memorializes each occurrence of a pointer to a lower-level metadata portion and identifies a specific lower-level metadata portion to which the pointer is pointing, thus resulting in a plurality of pointer records, wherein the memory device is assigned to a specific group of lower-level metadata portions; and
    identifying possible metadata corruption in one or more pointers, wherein identifying possible metadata corruption in the one or more pointers includes comparing a diagnostic reference count list for the specific group of lower-level metadata portions to a previously-generated reference count list, wherein the previously-generated reference count list includes a list of previously used pointers suspected of being corrupt.

12. The computing system of claim 11 further comprising:
    processing the plurality of pointer records on the memory device to generate a diagnostic reference count list for the specific group of lower-level metadata portions.

13. The computing system of claim 12 wherein the diagnostic reference count list defines a pointer count for each lower-level metadata portion included within the specific group of lower-level metadata portions.

14. The computing system of claim 11 wherein at least one occurrence of a pointer to a lower-level metadata portion is indicative of a deduplication event concerning the specific group of lower-level metadata portions.

15. The computing system of claim 11 wherein the memory device includes a plurality of discrete memory devices.

* * * * *